United States Patent
Cheung et al.

[11] Patent Number: 5,977,224
[45] Date of Patent: Nov. 2, 1999

[54] ROLL PRESS GRINDING AID FOR GRANULATED BLAST FURNACE SLAG

[75] Inventors: Josephine Ho-wah Cheung, Columbia; James Michael Gaidis, Woodbine, both of Md.

[73] Assignee: W.R. Grace & Co.-Conn., New York, N.Y.

[21] Appl. No.: 09/005,403

[22] Filed: Jan. 9, 1998

Related U.S. Application Data

[62] Division of application No. 08/512,732, Aug. 8, 1995, Pat. No. 5,720,796.

[51] Int. Cl.⁶ .............................. C22B 7/04; B04B 15/04
[52] U.S. Cl. .............................. 524/249; 75/746; 241/16
[58] Field of Search .............................. 524/249; 75/746; 241/16

[56] References Cited

U.S. PATENT DOCUMENTS

| | | |
|---|---|---|
| 3,443,975 | 5/1969 | Serafin . |
| 4,094,470 | 6/1978 | Waldhofer . |
| 4,175,975 | 11/1979 | MacWilliams . |
| 5,154,613 | 10/1992 | Cohen ................................. 433/228.1 |
| 5,203,512 | 4/1993 | Ferraris et al. . |
| 5,318,990 | 6/1994 | Strauss ................................. 524/549 |
| 5,720,796 | 2/1998 | Cheung et al. . |

FOREIGN PATENT DOCUMENTS

| | | |
|---|---|---|
| 26 06 039 | 8/1977 | Germany . |
| 2031109 | 12/1997 | Germany . |

OTHER PUBLICATIONS

Filio et al, "Dry Fine Grinding of Granulated Blast Furnace Slag Quenched by Water and Its Reactivity During Grinding", Jul. 4, 1991, pp. 795–800.

*Primary Examiner*—Nathan M Nutter
*Attorney, Agent, or Firm*—Craig K. Leon; William L. Baker

[57] ABSTRACT

A grinding aid and an enhanced roll press method of grinding granulated blast-furnace slag by treating the slag feed of the roll press with from about 0.002 to 0.2 weight percent of polyacrylic acid or its alkali metal salt in combination with up to about 4 weight percent water.

14 Claims, No Drawings

ROLL PRESS GRINDING AID FOR GRANULATED BLAST FURNACE SLAG

This application is a division of Ser. No. 08/512,732 filed Aug. 8, 1995, and issued as U.S. Pat. No. 5,720,796

BACKGROUND OF THE INVENTION

The present invention is directed to a grinding aid composition and to an enhanced method of grinding slag by using said grinding aid in conjunction with a roll press. Specifically, the present invention is directed to the use of polyacrylic acid or its alkali metal salt as a means of enhancing the grinding efficiency of slag material by a roll press mill circuit.

Slag is a by-product commonly obtained from iron blast furnace operations. Conventionally, the blast furnace is charged with layers of iron ore, flux stone, fuel and other sources of iron oxide as part of a highly controlled metallurgical process. Heat and oxygen are forced into the furnace to achieve very high temperatures and molten iron is collected by tapping the bottom of the furnace. Molten slag which is formed just above the molten iron is also tapped out and withdrawn from the furnace where it is quenched with water to produce a wet granular slag material.

The granulated blast furnace slag is a non-metallic product consisting mainly of silicates and alumino silicates of calcium and other bases. ASTM C-989 provides specifications for granulated slag which can be used in concrete and mortar compositions and ASHTO-MR02 provides the specification for the ground product which can be formed from the granular slag and used as a component in blended cements (e.g. ASTM C-595 Standard Specifications for Blended Hydraulic Cements).

Blended cement compositions can be formed by replacing a portion (up to about 50 weight percent) of the hydraulic cement component of the composition with a ground powder slag product. The cement compositions of mortar (hydraulic cement, small aggregate such as sand, and water) and concrete (hydraulic cement, small aggregate, large aggregate such as stone, and water) generally exhibit enhanced later age strength when slag is present as part of the composition.

Granulated slag is normally treated by ball mill or roll press to provide the powdered product. In the ball mill operation, the granules are treated by continuous random striking with the ball elements of the mill to break up the granules into the desired powder. The ball mill operates at higher efficiency when there is an agent (commonly called "grinding aid") present in the mill which causes the formed particles to remain dispersed within the ball mill. Thus, compounds such as lignosulfonates, triethanolamine and the like have been used in ball mill operations.

The roll press performs in a distinctly different mechanism from that of the ball mill. The slag granules are fed to the nip of a pair of rollers. The granules are subjected to a single squeezing force which occurs while the granules pass between the rollers. The rollers squeeze the granules causing them to fracture into very small particles as well as to cause fracturing of the granules which will completely disassociate upon subsequent subjection to a deagglomerator.

One problem associated with the roll press is the rate at which the feed granules are capable of passing between the rollers. Small particles (from recycle stream) have little problem passing through but larger granules (from raw feed) tend to be retained above the nip of the rollers. It is generally known that the addition of small amounts of water, such as about 3 weight percent based on the total feed, provides a means to aid in causing the large granules to enter the nip area more readily. It is believed that the water causes the granules and particles to adhere and interact to draw them through the nip area.

The final product must be a dry powder and, therefore, the water must be removed at the finishing end of the process. The use of water has the defects of requiring large amounts of energy to drive off the water from the powder product; reduces the efficiency of the deagglomerator and causes clogging of dust collectors which are associated with the process. Thus, it is desired to provide a composition which provides a means of enhancing the efficiency of slag pulverization by a roll mill while reducing the water required.

SUMMARY OF THE INVENTION

The present invention is directed to an improved roll press process for forming a powder slag product from granulated blast-furnace slag and to a grinding aid capable of causing said improved process. The process requires the application of polyacrylic acid or its alkali metal salts, as fully described below, to the roll press feed material to enhance the rate at which the feed material passes through the roll mill and to reduce the water content in the process.

DETAILED DESCRIPTION

The present invention is directed to an improved roll press process for forming powder or ground slag from granulated blast-furnace slag. The improvement requires the application of small amounts of polyacrylic acid or its alkali salts or mixtures thereof to the feed stream of the roll press. The application of polyacrylic acid or its alkali salts permits a large reduction of water to the feed stock while enhancing the flow of granulated slag through the roll mill. Thus, the presently described application of polyacrylic acid causes a reduction of energy consumption required for water removal at the finish end of the process and substantially reduces the other defects normally associated with the use of water in the subject process.

Polyacrylic acids or their alkali metal salt which are soluble in water have been found useful agents in the present invention. The term "polyacrylic acid" as used herein and in the appended claims means homopolymers of acrylic acid and copolymers of acrylic acid with an ethylenically copolymerizable monomers such as, for example, ethylene propylene, butadiene, styrene, methacrylic acid and the like. The copolymerizable monomers are normally present in up to 30 mole percent, preferably up to 20 mole percent. The preferred agents are homopolymers of acrylic acid and homopolymers of acrylic acid which are partially neutralized with an alkali metal base, such as the sodium salt of polyacrylic acid. The polymer should be water soluble. It should have a weight average molecular weight of at least about 25,000. The preferred polymer has a molecular weight of at least 50,000 and most preferably from about 50,000 to 500,000. Low molecular weight polymers do not provide the enhanced properties found when using the above described polyacrylic acids.

The polymer is dissolved in water to provide an aqueous solution having from about 10 to 50 (preferably 25 to 45) weight percent polymer solid in the solution. More concentrated solutions may be used provided the solution is sufficiently fluid to permit easy application.

In conventional roll press processing of slag, the amount of water used to enhance flow through the roll mill ranges from about 1 to 4 weight percent of the feed material. In the present process, the amount of polyacrylic acid used as part of the roll mill feed (that is granulated slag, and any recycled slag material from the classifier and/or deagglomerator) should range from about 0.002 to 0.3 (preferably 0.01 to 0.2) weight percent based on the total slag feed material. The polyacrylic acid may be applied as a separate aqueous solution or may be premixed with additional water to provide the total water feed, as described below, to the granulated slag which is required in the present process.

It has been unexpectedly found that the water used in the roll mill process can be substantially reduced when the subject polyacrylic acid is used. It has been unexpectedly found that the same results can be achieved with about half the amount of water when used with small amounts of polyacrylic acid according to the present invention to achieve the same efficiency at the roll press. The total water presently required is from about 0.1 to 4 (preferably 0.1 to 2 and most preferably 0.2 to 1) weight percent of the total slag feed. The water of the polyacrylic acid solution should be accounted for as part of the total water requirement. Thus, the amount of water present during the process operation and which needs to be removed at the finishing end is substantially less than conventionally used. Therefore, one observes less caking in the dust collector, and needs less energy to provide a dry powder product.

It has been further found that the subject polyacrylic acid can be used in combination with tertiary hydroxyalkylamines such as tri($C_2$–$C_4$ hydroxyalkyl) amine as, for example triethanolamine, triisopropanolamine and the like, as well as said tertiary amines where one or two of the hydroxyalkyl groups are replaced with $C_1$–$C_6$ alkyl and cycloalkyl groups, such as diethanolethylamine, diethylethanolamine and the like provided the tertiary amine is water soluble and miscible in the polyacrylic acid solution. The amine to polyacrylic acid should be used in a ratio of from 0.1 to 10.

The powder slag product formed may still contain the polyacrylic acid agent of the present invention therein. The polyacrylic acid required in the present process does not have an adverse effect on the pack set properties, compressive strength or set time of the formed cement composition when compared to conventional compositions.

The subject process is specifically directed to a roll press operation. In such a process the feed to the roll mill is composed of newly supplied granulated blast-furnace slag which is mixed with recycled material from the classifier, and optionally, the deagglomerator (e.g. hammer mill). Normally the total feed is composed of a mixture of slag material derived from recycle and newly supplied granulated slag in a ratio of from 3:1 to 5:1. The resultant product is a fine powder having a high Blaine surface area of about 500 to 900 $m^2$/kg with from 500 to 700 $m^2$/kg being conventionally desired.

EXAMPLE 1

Roll press forces were evaluated by a static laboratory test in which slag material was subjected to a single high pressure force and the resultant pressed cake product was agitated for a short period. It is believed that the ability of the initially formed pressed cake product to retain its integrity upon agitation directly correlates to the ability of slag to agglomerate and be carried into the nip of a roll press to provide an enhanced operation.

Granulated blast-furnace slag having a particle size distribution of U.S. Standard Sieve Size retained material equal to 10.6% on No. 8; 34.3% on No. 16; 37.1% on No. 30; 14.3% on No. 50; and 3.7% pass through was used. Multiple samples were formed, each from 80 parts by weight of the granulated slag which was subjected to a single pressure force of 106 bars by placing the slag in a 2-inch circular die of a Carver press. Sets of samples were formed in which 0%, 4% and 8% by weight water was added to the slag prior to subjection to the pressure force. In addition, a sample set was formed in which polyacrylic acid having a weight average molecular weight ($M_w$) of 50,000 was added to the slag as part of the 4% dosage.

Each pressed cake was placed on a No. 8 sieve as part of a sieve stack and subjected to agitation of both vertical and horizontal motion (using a Ro-Tap apparatus) for 1 minute. The amount of material retained on each of the sieves of the stack was weighed to determine the cohesion force achieved (amount of material retained on large mesh sieves).

The results in Table I below show that addition of water increases the cohesion of the press cake. This is established by increased amounts of material retained of the No. 8 sieve from 6.8 to 9.7 to 18.4 for the samples having 0, 4 and 8% water, respectively. The sample having 0.2 weight % polyacrylic acid and 3.8 weight % water to form a 4% dosage provided about 260% enhancement in cohesion over the 4% water-only sample and 138% better results than the 8% water sample.

These results indicate that enhanced cohesion can be obtained by adding small amounts of polyacrylic acid and that water content can be reduced to achieve equivalent cohesion to that achieved when using higher water dosages.

TABLE I

| Sieve No. | 0% $H_2O$ | 4% $H_2O$ | 8% $H_2O$ | 3.8% $H_2O$ 0.2% PAA |
|---|---|---|---|---|
| 8 | 6.8 | 9.7 | 18.4 | 25.3 |
| 16 | 30.8 | 45.1 | 63.7 | 38.0 |
| 30 | 41.1 | 43.8 | 16.2 | 36.4 |
| 50 | 21.0 | 0.3 | 0.0 | 0.3 |
| pan | 2.4 | 0.1 | 0.0 | 0.0 |

EXAMPLE 2

The test of Example 1 was repeated except that samples containing 0.5%, 1% and 2% water only were compared with a sample having 0.05% polyacrylic acid (Mw=50,000) and 0.45% water for a total liquid dosage of 0.5%. The slag used was a mixture of 1 part granulated blast furnace slag, described above in Example 1 and 4 parts of recycled material obtained from a classifier stream to form a feed composition having a particle size distribution of 13.8% on No. 8; 13.7% on No. 16; 17.0% on No. 30; 11.0% on No. 50 and 44.5% pass through.

The samples having 0.05% PAA and 0.45% water exhibited cohesion which was equal to or better than that exhibited by samples containing only water. The data of Table II shows that one can substantially reduce the water content of the roll press feed material while achieving equal or better processing through the nip-roll press and avoid the removal of a large portion of water.

TABLE II

| Sieve No. | 0.5% water | 1% water | 2% water | 0.05% PAA + 0.4% water |
|---|---|---|---|---|
| 8 | 10.0 | 13.4 | 13.7 | 14.5 |
| 16 | 13.4 | 12.1 | 15.0 | 11.6 |

TABLE II-continued

| Sieve No. | 0.5% water | 1% water | 2% water | 0.05% PAA + 0.4% water |
|---|---|---|---|---|
| 30 | 18.2 | 16.1 | 20.2 | 15.6 |
| 50 | 13.0 | 13.G | 24.8 | 11.0 |
| Pan | 45.4 | 45.3 | 26.3 | 47.3 |

EXAMPLE 3

Samples were formed as in Example 2 in which the samples contained polyacrylic acid which was further doped with 0.05 wt. % triisopropanolamine. The pressed cakes were subjected to a 4-pound impactor (50 Joules energy) three times. The resultant material was sieved and the materials retained on the No. 8 and No. 16 sieves were combined and further impacted three more times. The resultant material was analyzed by passing through a sieve stack. It was determined that the samples having triisopropanolamine as part of the additive would provide a higher percentage of fines when subjected to a deagglomerator, such as a hammer mill.

What is claimed is:

1. A grinding aid composition useful in grinding granulated blast-furnace slag by a roll press process, comprising: [which is comprised of] an aqueous solution having dissolved therein from about 10 to 50 weight percent polyacrylic acid of a weight average molecular weight of at least 25,000 or its alkali metal salts or mixtures thereof; and said composition further incorporating an amine comprising a triisopropanolamine, diethanolamine, diethylethanolamine, diethanolethylamine, or a mixture thereof.

2. The grinding aid composition of claim 1 wherein the polyacrylic acid has a weight average molecular weight of from about 50,000 to 500,000.

3. The grinding aid composition of claim 1 wherein the polyacrylic acid has a weight average molecular weight of from about 50,000 to 500,000.

4. The grinding aid composition of claim 1 wherein said amine comprises triisopropanolamine.

5. The grinding aid composition of claim 1 wherein said amine comprises diethanolamine.

6. The grinding aid composition of claim 1 wherein said amine comprises diethylethanolamine.

7. The composition of claim 4 wherein said polyacrylic acid has a weight average molecular weight of from about 50,000 to 500,000.

8. The composition of claim 5 wherein said polyacrylic acid has a weight average molecular weight of from about 50,000 to 500,000.

9. The composition of claim 6 wherein said polyacrylic acid has a weight average molecular weight of from about 50,000 to 500,000.

10. The composition of claim 1 wherein said polyacrylic acid comprises a homopolymer of acrylic acid, copolymers of acrylic acid with an ethylenically copolymerizable monomer, or a mixture thereof.

11. The composition of claim 10 wherein said ethylenically copolymerizable monomer comprises ethylene, propylene, butadiene, styrene, methacrylic acid, or mixture thereof.

12. The composition of claim 1 wherein said polyacrylic acid comprises a homopolymer of acrylic acid that is partially neutralized as a sodium salt.

13. A composition comprising powder slag incorporating the grinding aid composition of claim 1.

14. A grinding aid composition useful in grinding granulated blast-furnace slag by a roll press process, comprising: an aqueous solution having dissolved therein from about 10 to 50 weight percent polyacrylic acid of a weight average molecular weight of at least 25,000 or its alkali metal salts or mixtures thereof; said composition further comprising an alkanolamine selected from the group of triisopropanolamine and tertiary alkanolamines comprising diethanolethylamine, diethylethanolamine, or a mixture thereof, said tertiary alkanolamine being water soluble and miscible in said polyacrylic acid aqueous solution; said amine and said polyacrylic acid being used in a ratio of 0.1 to 10.

* * * * *